1

3,156,724
PREPARATION OF 2,2'-DICHLOROHYDRAZO-BENZENE
Raymond E. Werner, Norbert Young, John J. Prichett, and Charles E. Brenner, Cincinnati, Ohio, assignors to Sterling Drug Inc., New York, N.Y., a corporation of Delaware
No Drawing. Filed Oct. 25, 1962, Ser. No. 233,146
3 Claims. (Cl. 260—569)

This invention relates to a novel process for producing 2,2'-dichlorohydrazobenzene, an important and valuable compound useful in the production of 3,3'-dichlorobenzidine, an azo dye intermediate. More particularly, the instant invention relates to a novel process for producing 2,2'-dichlorohydrazobenzene from ortho-nitrochlorobenzene by catalytic hydrogenation.

As is well-known in the art, the catalytic hydrogenation of ortho-nitrochlorobenzene and many similar halogen substituted aromatic nitro compounds results under ordinary conditions not only in a reduction reaction but also in extensive dehalogenation. The undesired dehalogenation reaction can in some cases be minimized, for instance by using as the catalytic hydrogenation catalyst specially prepared copper oxide-chromic oxide or rhodium catalyst, or platinum-on-carbon catalyst in the presence of magnesium oxide or hydroxide. However, the primary product in each of these special catalytic hydrogenation methods is the halogenated aromatic primary amine corresponding to the halogenated aromatic nitro compound used as the starting material and hence none of these prior methods is adapted to the production of 2,2'-dichlorohydrazobenzene.

It is an object of the instant invention to provide means whereby ortho-nitrochlorobenzene can be catalytically hydrogenated to yield 2,2'-dichlorohydrazobenzene as the chief reduction product.

The novel process of the instant invention comprises catalytically hydrogenating ortho-nitrochlorobenzene in an alkaline reaction medium at a temperature in the approximate range 40–100° C. in the presence of a relatively small amount by weight of a naphthalene compound of the group consisting of 2,3-dichloro-1,4-naphthoquinone, 1,4-naphthoquinone, and 1,4-naphthalenediol and in the presence of a metal catalyst of the group consisting of palladium and platinum hydrogenation catalysts, whereby 2,2'-dichlorohydrazobenzene is produced as the major reaction product.

The hydrogenation is carried out until no more hydrogen is absorbed. In addition to the major reaction product, 2,2'-dichlorohydrazobenzene, the resulting reaction mixture contains as by-products a relatively minor amount of ortho-chloroaniline and only a very small proportion of dehalogenated product. These products can be readily separated from the other components of the reaction mixture, that is, the alkaline reaction medium, the naphthalene compound, and the catalyst, and if desired can be separated from each other, by conventional means, for instance by extraction procedures.

The amount of naphthalene compound, that is the 2,3-dichloro-1,4-naphthoquinone, 1,4-naphthoquinone, or 1,4-naphthalenediol, required for satisfactory results in the process of our invention is relatively small compared to the amount of the ortho-nitrochlorobenzene starting material. Thus, the preferred weight ratio of naphthalene compound to ortho-nitrochlorobenzene falls in the approximate range 0.004:1 to 0.008:1. Below this range, the yield of 2,2'-dichlorohydrazobenzene begins to drop off, and for this reason the lower limit of the weight ratio for practical purposes is approximately 0.002:1. Weight ratios substantially above 0.008:1, for instance 0.025:1 or even higher, can be employed if desired, but use of these larger proportions of the naphthalene compound is without any substantial improvement in the yield of 2,2'-dichlorohydrazobenzene and affords no particular advantage.

The palladium and platinum hydrogenation catalysts employed in our new method are well-known in the art. The conventional palladium-on-carbon and platinum-on-carbon hydrogenation catalysts, which usually contain about 0.5–10 percent by weight of palladium or platinum metal on a carbon support, are especially suitable in the practice of our invention. The amount of hydrogenation catalyst required is relatively small. Preferably, the ratio of the weight of the metal in the hydrogenation catalyst to the weight of the ortho-nitrochlorobenzene falls in the approximate range 0.0002:1 to 0.001:1, and to avoid significantly lowered yields of 2,2'-dichlorohydrazobenzene is at least approximately 0.0001:1. We have found that larger proportions of the hydrogenation catalyst, for instance weight proportions of metal to ortho-nitrochlorobenzene of 0.02:1 to 0.03:1 or more, afford satisfactory results but the use of such larger amounts of the catalyst does not ordinarily represent the most economical procedure. Mixtures of palladium and platinum hydrogenation catalysts are also satisfactory.

The alkaline reaction medium used in the process of this invention is conveniently a 2 to 20 percent aqueous solution of sodium or potassium hydroxide or equivalent alkali. Higher alkalinity decreases the rate of the hydrogenation reaction, and lower alkalinity results in a diminished yield of 2,2'-dichlorohydrazobenzene. For best results, we ordinarily prefer to employ a 13–14 percent aqueous solution of sodium hydroxide for this purpose.

Although it is not necessary to use an organic solvent in conjunction with the alkaline aqueous reaction medium in our new process, we ordinarily prefer to use one since the speed of the hydrogenation reaction is thereby increased. Thus, for instance the water in the reaction medium can be replaced with some advantage by an aqueous solution of a water-miscible organic solvent, for instance 30–50 percent aqueous ethyl alcohol. Alternatively, and in a preferred mode of operation, we use in addition to the alkaline aqueous reaction medium a water-immiscible organic solvent such as benzene, toluene, xylene or the like in which both the starting ortho-nitrochlorobenzene and the 2,2'-dichlorohydrazobenzene are readily soluble. Proceeding in accordance with this preferred procedure, not only is the hydrogenation reaction relatively rapid but also is desired 2,2'-dichlorohydrazobenzene and the associated aromatic by-products are produced in a water-immiscible solution which after completion of the reaction can be readily and conveniently separated from the hydrogenation catalyst and the alkaline aqueous reaction medium.

The temperature of the reaction mixture during the hydrogenation is held in the approximate range 40° C. to 100° C. and for best yields of 2,2'-dichlorohydrazobenzene in the approximate range 60° C. to 70° C.

The hydrogen pressure is not a critical feature of the process and can be varied over a wide range. As a matter of convenience, we employ hydrogen pressures in the range 20 to 125 pounds per square inch (absolute); when employing the conventional commercial equipment used in catalytic hydrogenations we ordinarily prefer a hydrogen pressure in the approximate range 25 to 40 pounds per square inch.

The time required for completion of the hydrogenation reaction of course varies with the particular reaction conditions which have been selected but is usually on the order of four to twenty-four hours.

Depending on the several variables involved, the yield of 2,2'-dichlorohydrazobenzene afforded by our new process usually varies from about 80 percent to 90 percent. In contrast with these high yields, when the naphthalene compound is omitted from the reaction mixture the yield of 2,2'-dichlorohydrazobenzene is very low, and the major reaction product (70–80 percent or more by weight) is a mixture of aniline, ortho-chloroaniline, and hydrazobenzene.

When, as is frequenlty the case, the 2,2'-dichlorohydrazobenzene is to be arranged to 3,3'-dichlorobenzidine, it is unnecessary to separate the ortho-chloroaniline and the aniline by-products of the hydrogenation reaction, since these by-products do not enter into or interfere with the rearrangement reaction and are more readily and conveniently removed from the 3,3'-dichlorobenzidine than from the 2,2'-dichlorohydrazobenzene.

Our invention is illustrated by the following examples without, however, being limited thereto.

Example 1

To a shaking bottle type hydrogenator there were charged 78.5 g. of ortho-nitrochlorobenzene, 0.5 g. of 5 percent palladium-on-carbon catalyst, 1.0 g. of 2,3-dichloro-1,4-naphthoquinone, 30 g. of 50 percent aqueous sodium hydroxide, 100 ml. of water and 1.0 g. of sodium decylbenzenesulfonate. This mixture was hydrogenated at approximately 50–60° C. under hydrogen pressure of 65–70 pounds per square inch (absolute) until absorption of hydrogen had virtually ceased. The reaction mixture was diluted with 250 ml. of water, cooled to 10° C., and filtered. The solid thus collected was washed with water and then was slurried in 100 ml. of 5 percent hydrochloric acid, and the resulting slurry was filtered. The solid thus collected consisted of a mixture of 57.0 g. of 2,2'-dichlorohydrazobenzene, M.P. 83–85° C. and 0.5 g. of palladium-on-carbon hydrogenation catalyst.

When the above hydrogenation procedure was repeated with the exception that 0.5 g. of 5 percent platinum-on-carbon catalyst was substituted for the palladium catalyst, there was obtained as the major reduction product 2,2'-dichlorohydrazobenzene in substantially the same yield and quality as was obtained in Example 1.

Example 2

6 pounds of sodium decylbenzenesulfonate was dissolved in 400 pounds of water, and 4.25 pounds of 2,3-dichloro-1,4-naphthoquinone was slurried in the solution thus obtained. To the resulting slurry there were added first an aqueous alkaline solution prepared by mixing 148 pounds of 50 percent aqueous sodium hydroxide solution and 161 pounds of water, and then 930 pounds of toluene, 1100 pounds of melted ortho-nitrochlorobenzene (M.P. 32.5° C.), and a slurry obtained by stirring into 3 gallons of water 4.92 pounds of 5 percent palladium-on-carbon hydrogenation catalyst wet with an equal weight of water (weight of palladium: 0.246 pound). The mixture obtained in this manner was catalytically hydrogenated at 65–70° C. under hydrogen pressure of approximately 33 pounds per square inch (absolute), with agitation of the hydrogenation vessel, until no more hydrogen was absorbed. The reaction was complete after approximately twenty hours. The reaction mixture was then treated with 10 pounds of decolorizing charcoal and filtered, the solid thus collected was washed on the filter with 10 gallons of toluene, and the resulting filtrates were combined and allowed to separate into two layers, an upper toluene layer which was retained and a lower aqueous layer which was drained off and discarded. The toluene layer was a solution of approximately 715 pounds of 2,2'-dichlorohydrazobenzene and approximately 60 pounds of ortho-chloroaniline together with small quantities of deschlorinated products. This toluene solution was used without further treatment as the starting material in a conventional rearrangement reaction to convert the 2,2'-dichlorohydrazobenzene component thereof to 3,3'-dichlorobenzidine in good yield and of high quality.

When it was desired to isolate the 2,2'-dichlorohydrazobenzene from the toluene solution obtained by the procedure described above, this was carried out by washing the solution with dilute hydrochloric acid and then distilling the toluene from the solution under reduced pressure so as to leave the 2,2'-dichlorohydrazobenzene as a residue.

The yields of 2,2'-dichlorohydrazobenzene obtained in several runs by the foregoing procedure varied from 696 pounds to 731 pounds per run, and averaged about 715 pounds per run.

We claim:
1. The process which comprises catalytically hydrogenating ortho-nitrochlorobenzene in an alkaline reaction medium at a temperature in the approximate range 40–100° C. in the presence of a relatively small amount of a naphthalene compound of the group consisting of 2,3-dichloro-1,4-naphthoquinone, 1,4-naphthoquinone, and 1,4-naphthalenediol and in the presence of a metal catalyst of the group consisting of palladium and platinum hydrogenation catalysts, whereby 2,2'-dichlorohydrazobenzene is produced as the major reaction product.

2. The process which comprises catalytically hydrogenating ortho-nitrochlorobenzene in an alkaline reaction medium at a temperature in the approximate range 40–100° C. in the presence of a relatively small amount of 2,3-dichloro-1,4-naphthoquinone, and in the presence of a palladium hydrogenation catalyst, the weight ratio of 2,3-dichloro-1,4-naphthoquinone to ortho-nitrochlorobenzene being at least 0.004:1, whereby 2,2'-dichlorohydrazobenzene is produced as the major reaction product.

3. The process which comprises catalytically hydrogenating ortho-nitrochlorobenzene in a mixture of toluene and a 13–14 percent aqueous solution of sodium hydroxide at a temperature in the approximate range 60–70° C. in the presence of a relatively small quantity of 2,3-dichloro-1,4-naphthoquinone and in the presence of a palladium-on-carbon satalyst, the weight ratio of 2,3-dichloro-1,4-naphthoquinone to ortho-nitrochlorobenzene being in the approximate range 0.004:1 to 0.008:1 and the weight ratio of palladium to ortho-nitrochlorobenzene being in the approximate range of 0.0002:1 to 0.001:1, whereby 2,2'-dichlorohydrazobenzene is produced as the major reaction product.

References Cited in the file of this patent

UNITED STATES PATENTS

| | | |
|---|---|---|
| 2,383,134 | Lacey | Aug. 21, 1945 |
| 2,645,636 | Sogn | July 14, 1953 |
| 2,688,040 | Adams et al. | Aug. 31, 1954 |
| 2,794,046 | Sogn | May 28, 1957 |
| 2,974,047 | Sogn | May 28, 1957 |
| 3,063,980 | Bloom et al. | Nov. 13, 1962 |